Feb. 1, 1938.                D. WOOD                    2,106,941
                            CONVEYER
              Original Filed Sept. 21, 1936      4 Sheets-Sheet 1

Inventor:-
Dennis Wood,
By:- Smith, Michael & Gardiner
                        Attorneys.

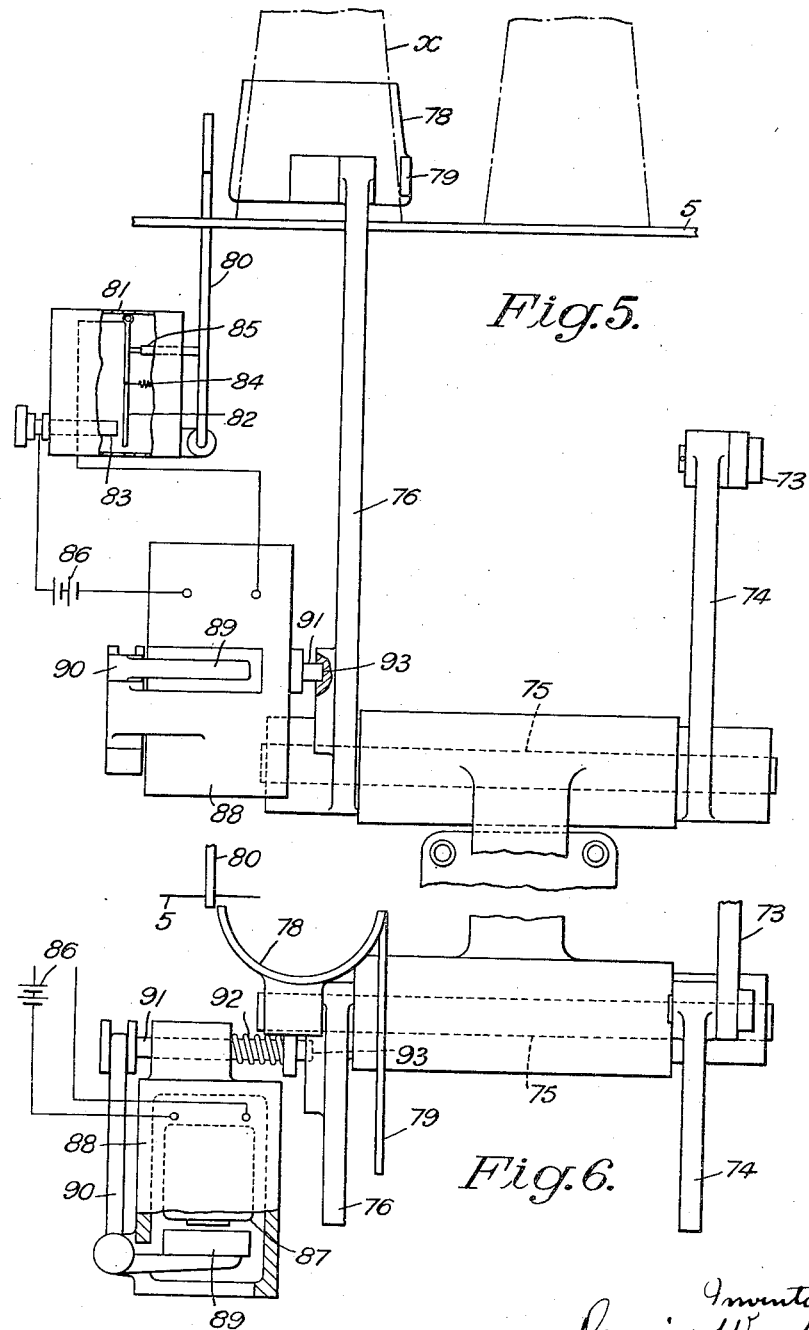

Patented Feb. 1, 1938

2,106,941

UNITED STATES PATENT OFFICE 2,106,941

CONVEYER

Dennis Wood, Stanmore, England

Original application September 21, 1936, Serial No. 101,835. Divided and this application March 10, 1937, Serial No. 130,180. In Great Britain August 30, 1935

2 Claims. (Cl. 198—21)

This application is a division of Serial No. 101,835 filed September 21, 1936, of which the following is a specification.

This invention relates to a conveyer for feeding cartons or like articles to a machine, for example to a waxing machine in the manufacture of cartons to be employed as containers for milk or other substances, whether liquid, semi-liquid or solid.

The main object of the invention is to provide improved conveying means for transferring the cartons or like articles to the machine, the cartons being brought for example by a belt conveyer from the preceding machine in which they have been made.

Another object of the invention is to control the conveyer or transfer means in relation to the supply of cartons to ensure their transfer singly and in proper manner towards the machine.

In the accompanying drawings,—

Figs. 5 and 6 are a side elevation and a plan respectively of an electromagnetic control device for the transfer mechanism.

Figure 1:
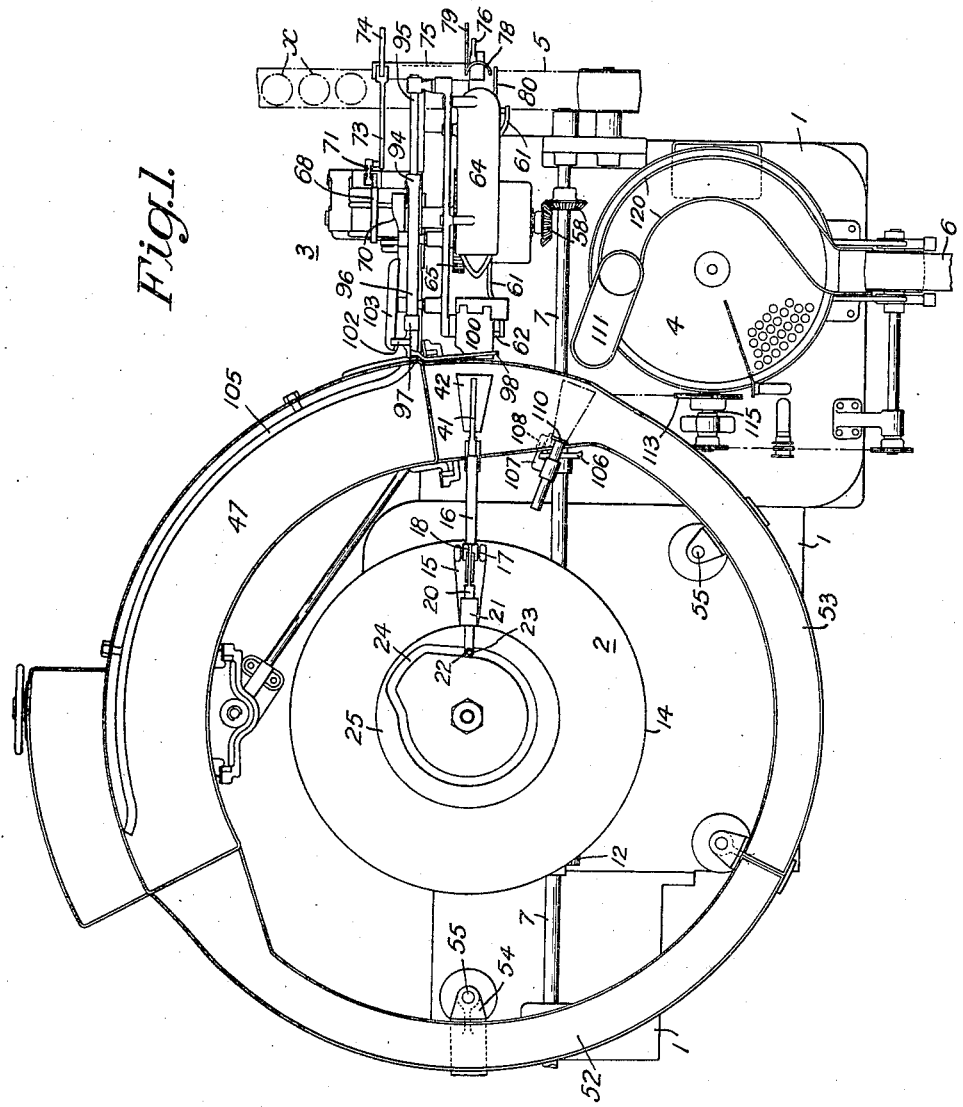
Fig. 1 is a plan of the complete waxing machine.
Figure 2:
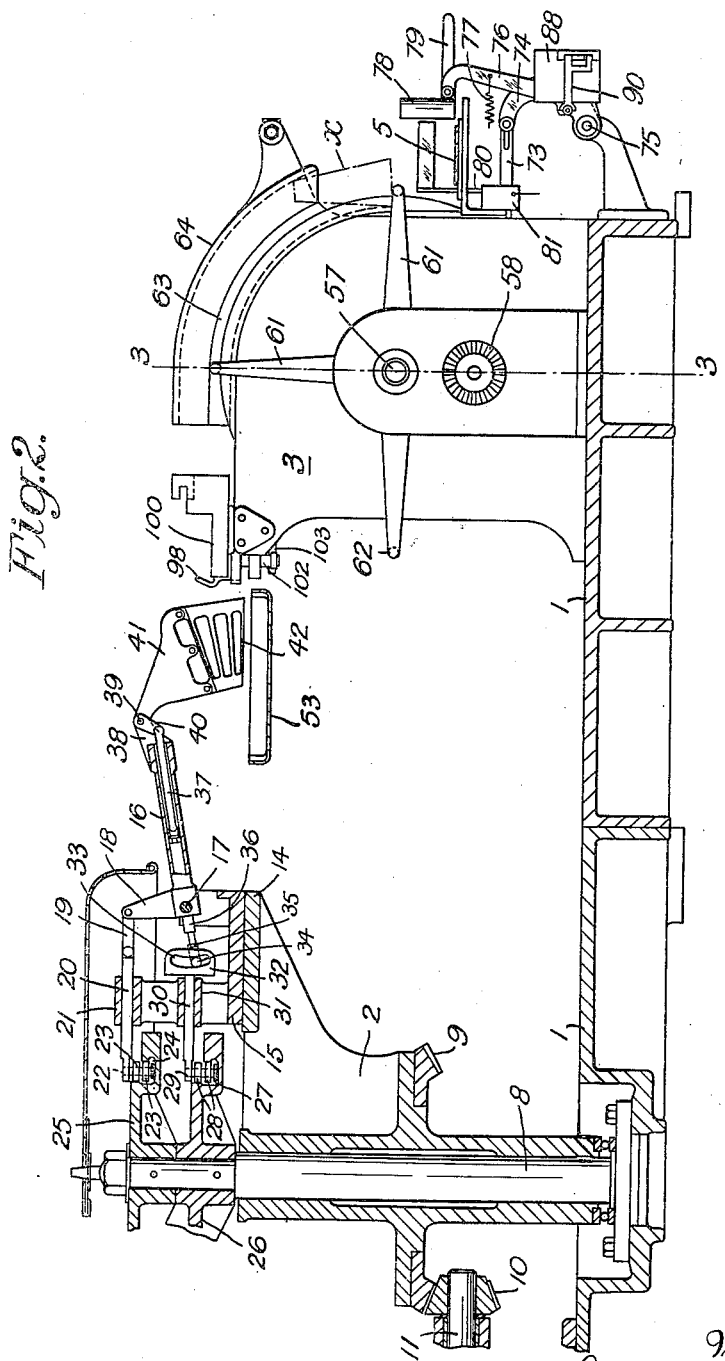
Fig. 2 is a part sectional elevation on a larger scale showing one carton holder in position aligned with the transfer means.
Figure 3:
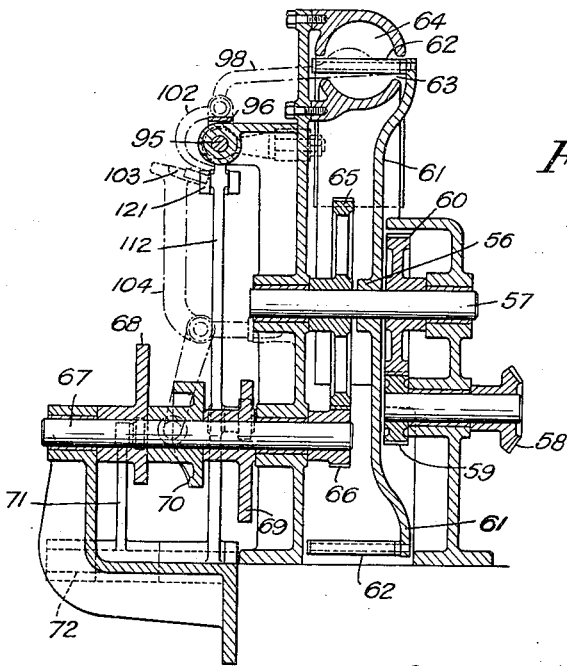
Fig. 3 is a sectional elevation of the transfer mechanism, taken on the line 3—3 of Fig. 2, but on a larger scale.

Referring to Figs. 1 and 2, the waxing machine comprises a base 1, preferably made in sections bolted together, upon which there is mounted a rotatable carrier 2 for the dipping devices, a mechanism 3 for transferring the cartons or the like to the dipping devices, and a rotary table 4 to which the cartons are delivered after dipping. A belt conveyer 5 brings the cartons to the transfer mechanism, and a second conveyer 6 receives them from the rotary table after delivery. All these mechanisms are driven by a main shaft 7, as described in my pending application for patent filed Sept. 21, 1936, Serial No. 101,835.

The transfer mechanism comprises a wheel 56 mounted upon a horizontal shaft 57 driven from the main shaft 7 through bevel wheels 58 and reducing gears 59, 60; the wheel 56 has equally spaced arms 61, for example four in number, provided with fingers 62 extending parallel to the shaft 57, these fingers being adapted to pass in turn through open slots 63 in a tubular guide 64 as the wheel 56 revolves. The movement of the wheel carries the fingers close to the edge of the conveyer belt 5 upon which the cartons stand in a vertical position, resting upon their closed or larger ends, and from which they are pushed laterally, in timed relation to the wheel 56, so that a carton $x$ is lifted by a finger 62 and pushed up through the tubular guide 64 for transfer to the holder 42 at the feeding position of the carrier 2. The shaft 57 is also fitted with a gear wheel 65 meshing with a pinion 66 secured upon a timing shaft 67, the latter revolving at four times the speed of the wheel 56 in the case where four fingers 62 are provided on the wheel, so that each lifting movement corresponds to one revolution of the shaft 67; three cams are secured upon the timing shaft, one cam 68 effecting the lateral movement of the carton from the conveyer belt 5, another cam 69 operating a device for transfer of the carton to the holder 42, and the third cam 70 controlling the movements of the said transfer device, the third one being a face cam.

The cam 68 engages a roller-fitted arm 71 rocking on a pivot 72 and connected by a link 73 to a crank arm 74 secured to a rock shaft 75, the other end of which carries a striker arm 76 extending above the conveyer belt 5; when the cam 68 pushes back the roller-fitted arm 71, the arm 76 is also pushed back clear of the cartons upon the belt, but as the cam 68 revolves it allows the arm 76 to advance under the action of a spring 77 so that a striker plate 78 mounted at the top of the arm 76 can push the foremost carton $x$ standing upon the belt 5 laterally over towards the rising finger 62 which is to lift it into the guide 64, as already described, the carton beginning to tilt as soon as it reaches the edge of the belt. The striker plate 78, which may be curved transversely as shown, is provided with a tail-piece 79 lying in the plane of its movement, in order to hold back any further cartons arriving along the conveyer belt 5 while the arm 76 is rocking over the top of the belt. The movements of the striker arm 76, operated by the cam 68, are timed in relation to those of the fingers 62 by the setting of the cam upon the shaft 67 and the timing of the gears 65, 66, so that the finger catches the carton $x$ at the right moment, but in order to ensure that the cartons are struck singly and in proper manner by the arm 76 there is provided an electromagnetic control device illustrated more clearly in Figs. 5 and 6.

This control device comprises a stop arm 80 mounted on a box 81 containing a pair of electric contacts 82, 83, normally separated by a spring 84 but adapted to be brought together by a pin 85 projecting from the arm 80; the upper end of the latter is cranked to extend over the belt 5 into the path of the cartons travelling along the belt, so that when a carton strikes against the stop arm 80 the latter will close the contacts 82, 83 and also hold the carton stationary in a position facing the striker-plate 78. The contacts 82, 83 are included in an electrical circuit extending from a battery 86 or other source of current, through the winding 87 of an electromagnet 88 having an armature 89 carried by a bell crank lever 90; this lever forms a striking fork for a slidable bar 91 mounted in the side of the magnet casing and fitted with a spring 92 which normally holds the end of the bar in engagement with a hole 93 in the boss of the striker arm 76, thereby latching the arm in its retracted position. When the circuit is closed by the rocking of the stop arm 80, the bell crank 90 shifts the latch bar 91 clear of the striker arm 76 so that the latter can advance under the action of the spring 77 as soon as the cam 68 allows the rocking of the arm 71; thus the striker-plate 78 will push the carton off the belt 5 in time for the rise of the next finger 62. If the carton arrives too early at the position of the striker plate, it will be held back by the stop arm 80 until the next regular stroke of the striker plate 78.

Figure 4:
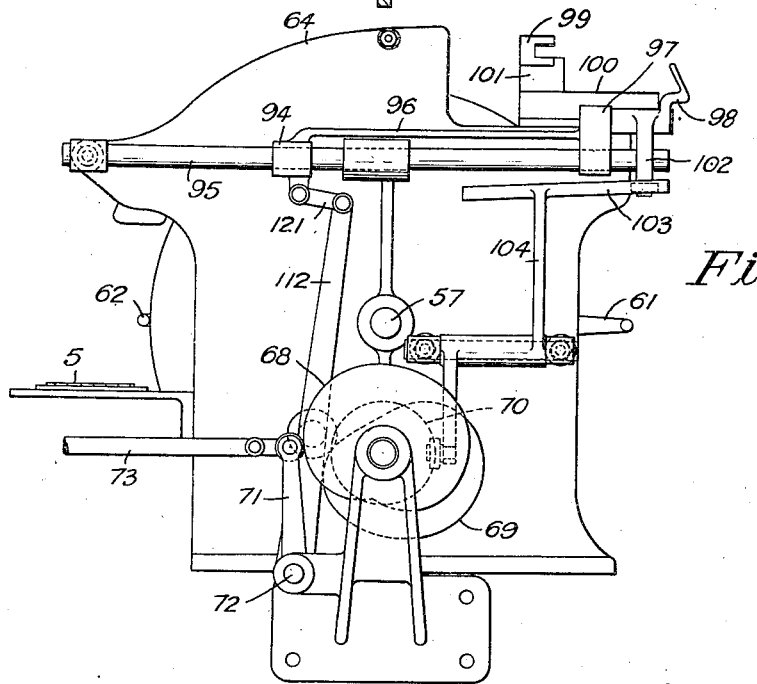
Fig. 4 is a partial elevation of the transfer mechanism, as seen from the left of Fig. 3.

The cam 69 for transferring the cartons into the holder 42 operates through a roller-fitted lever 112 which rocks about the same pivot as the arm 71, but this lever extends upward to connect by a link 121 with a slider 94 movable along a fixed guide bar 95 on the outside of the casing; see Fig. 4. This slider 94 is connected by a bridge 96 to a block 97 also movable along the guide bar 95, this block forming a displaceable fulcrum for a striker lever 98 which serves to transfer the cartons successively into the holders 42 of the dipping devices from a cradle 100 in which they are deposited by the fingers 62 after passage through the tubular guide 64. The cradle 100 has an overhanging cover 99 supported from one side with an opening 101 at the other side to allow the lever 98 to pass along it when pushing the cartons out into the holder 42, this movement produced by the cam 69 being timed to take place after the carton has come to rest in the cradle; during such movement, the lever 98 is held from rocking by the engagement of its roller-fitted arm 102 with a guide rail 103 at the upper end of a lever 104 which is stationary at this time.

The cam-face 70 engages the roller-fitted lower end of the lever 104 and thereby controls the position of the guide rail 103; after the lever 98 has pushed a carton forward into the holder 42, the lever is clear of the cradle 100, as seen in Fig. 4, and the cam 70 then rocks the lever 104, causing the guide rail 103 to force back the arm 102 and raise the lever 98 above the cradle, so that its return movement due to the cam 69 can take place over the top of the cradle, the lever 98 being allowed to descend behind the cradle after the next finger 62 has deposited a carton therein and moved clear.

At the feeding position, as seen in Fig. 2, the tubular arm 16 is raised slightly above the horizontal, while the carton holder 42 has its lower side approximately horizontal; in this position, the transfer lever 98 operated by the cam 69 as above described pushes a carton $x$ from the cradle 100 into the holder, the carton having its smaller and open end in advance so as to wedge in the holder or basket. During the motion of the carrier 2 round the center pillar 8, the tubular arm 16 will be caused by the first cam groove 24 to rock about its pivot 17 while the holder 42 is still kept in the same relation to the arm, the carton being thus lowered into the tank 47; the angle at which the carton enters the wax is so arranged as to ensure the escape of air from the interior, the upper side being submerged first at the closed end and finally at the open end or mouth.

During the travel of the carton along the waxing tank 47, it is held in position in the holder or basket 42 by a curved guide rail 105 which prevents movement of the carton in a radially outward direction. Towards the end of the revolution of the carrier, the carton holder 42 is lowered to an approximately horizontal position, the dipping arm 16 having now reached the final or stripping position where the waxed carton is to be taken off.

The removal of the cartons from the holders 42 at this position is operated by a cam 106 upon the main shaft 7, in timed relation to the movement of the rotary carrier 2, by means of a lever 107 pivoted at 801 and working in a vertical plane at this final position. The upper end of the lever 107 carries a pad 110 which strikes against the inner end of the carton supported in the holder 42, with a quick movement in a direction radial of the carrier so as to eject the carton horizontally out of the basket or holder 42, when it falls down a curved tubular chute 111 so as to arrive in a vertical position (base downwards) upon a slowly rotating table consisting of a perforated disc 4 driven by the main shaft 7, through chain sprockets 113, and a countershaft 115. As the disc 4 rotates, it carries the cartons between two fixed guide rails 120, one or both of which will be so shaped as to guide the cartons from the disc on to a conveyer belt 6 whence they may proceed to a cooling chamber, storage room or filling machine.

What I claim is:—

1. Means for feeding articles standing upon a conveyer belt to a machine, comprising a wheel rotatable on a horizontal axis in proximity to said belt, the plane of rotation of said wheel being perpendicular to the travel of said belt, a plurality of finger-like members secured on said wheel, said members being perpendicular to the plane of rotation of said wheel and passing upwards in turn beside said belt, means for pushing said articles one at a time laterally off said belt at a position aligned with the upward movement of said members, and a tubular guide concentric with said wheel, said guide having a continuous slot at one side for the passage of said members during rotation of said wheel, said members catching said articles as pushed off said belt and lifting them one at a time through said guide, and said articles being steadied at their upper ends by said guide while standing on said members.

2. Means for feeding articles standing upon a conveyer belt to a machine, comprising a wheel rotatable on a horizontal axis in proximity to said belt, the plane of rotation of said wheel being perpendicular to the travel of said belt, a plurality of finger-like members secured on said wheel, said members being perpendicular to the plane of rotation of said wheel and passing upwards in turn beside said belt, means for pushing said articles one at a time laterally off said belt at a position aligned with the upward movement of said members, said pushing means including a striker adapted to engage an article occupying said aligned position, a spring tending to cause said striker to engage said article, and a cam revolving in timed relation to the rotation of said wheel, said cam operating to force back said striker in opposition to said spring after an article has been pushed off said belt, an electromagnetic control for said pushing means, said control adapted to lock said striker in the position to which it is forced back by said cam but being released by the arrival of an article at said aligned position, and a tubular guide concentric with said wheel, said guide having a continuous slot at one side for the passage of said members during rotation of said wheel, said members catching said articles as pushed off said belt and lifting them one at a time through said guide, and said articles being steadied at their upper ends by said guide while standing on said members.

DENNIS WOOD.